(12) United States Patent
He et al.

(10) Patent No.: US 11,922,045 B2
(45) Date of Patent: Mar. 5, 2024

(54) METHOD, DEVICE AND COMPUTER PROGRAM PRODUCT FOR DATA BACKUP

(71) Applicant: EMC IP Holding Company LLC, Hopkinton, MA (US)

(72) Inventors: Guangjun He, Chengdu (CN); Leon Yang Liu, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 34 days.

(21) Appl. No.: 16/867,260

(22) Filed: May 5, 2020

(65) Prior Publication Data
US 2021/0181946 A1 Jun. 17, 2021

(30) Foreign Application Priority Data
Dec. 13, 2019 (CN) .......................... 201911284829.8

(51) Int. Cl.
*G06F 3/06* (2006.01)
*G06N 20/00* (2019.01)

(52) U.S. Cl.
CPC ............ *G06F 3/065* (2013.01); *G06F 3/0619* (2013.01); *G06F 3/067* (2013.01); *G06N 20/00* (2019.01)

(58) Field of Classification Search
CPC ........ G06F 3/065; G06F 3/067; G06F 3/0619; G06F 11/1446; G06N 20/00
See application file for complete search history.

(56) References Cited

U.S. PATENT DOCUMENTS

| | | | |
|---|---|---|---|
| 9,798,629 B1* | 10/2017 | Shilane | G06F 11/1464 |
| 10,977,110 B2* | 4/2021 | Matei | G06N 5/003 |
| 11,036,483 B2* | 6/2021 | Veljanoski | G06F 8/71 |
| 2019/0278661 A1* | 9/2019 | Mehta | G06F 11/1451 |
| 2020/0025402 A1* | 1/2020 | Bell | G05D 23/1923 |
| 2021/0150383 A1* | 5/2021 | Lindstrom | G06F 3/0673 |

* cited by examiner

*Primary Examiner* — Jason W Blust
(74) *Attorney, Agent, or Firm* — WOMBLE BOND DICKINSON (US) LLP (57) ABSTRACT

According to example embodiments of the present disclosure, a method, device and computer program product for data backup are proposed. The method comprises: obtaining a respective current value of an attribute associated with a respective backup for at least one client in a backup system and an expected time window for performing the respective backup; determining a respective duration of the respective backup based on the respective current value; and determining a respective backup time period for performing the respective backup for the at least one client based on the respective duration and the expected time window. As such, the present solution may implement automatic backup scheduling.

20 Claims, 7 Drawing Sheets

| CLIENT TYPE | ATTRIBUTES ||||| 
| | CLIENT SETTING | TOTAL PROTECTING BYTE NUMBER | TOTAL PROTECTING FILE NUMBER | DATA ENCRYPTION LEVEL | BACKUP TARGET |
| --- | --- | --- | --- | --- | --- |
| 1 | SETTING 1 | 153083904 | 5 | HIGH | BACKUP SERVER 1 |
| 3 | SETTING 2 | 10897408 | 2 | HIGH | BACKUP SERVER 1 |
| ...... |||||| 
| 1 | SETTING J | 6262821 | 1 | LOW | BACKUP SERVER 2 |

| | | EXPECTED TIME WINDOW | | | | | | | | | | | |
|---|---|---|---|---|---|---|---|---|---|---|---|---|---|
| | | 0:00 | 0:30 | 1:00 | 1:30 | 2:00 | 2:30 | 3:00 | 3:30 | 4:00 | 4:30 | 5:00 | 5:30 |
| NUMBER OF CONCURRENT THREADS | THREAD 1 | BACKUP 1 | | | BACKUP 2 | | BACKUP 3 | | BACKUP 4 | | | | |
| | THREAD 2 | BACKUP 5 | | | | BACKUP 6 | | | BACKUP 7 | | | | |
| | THREAD 3 | BACKUP 8 | | | | | | | | | | | |
| | THREAD 4 | | | | | | | | | | | | |

| | | EXPECTED TIME WINDOW | | | | | | | | | | |
|---|---|---|---|---|---|---|---|---|---|---|---|---|
| | | 0:00 | 0:30 | 1:00 | 1:30 | 2:00 | 2:30 | 3:00 | 3:30 | 4:00 | 4:30 | 5:00 | 5:30 |
| NUMBER OF CONCURRENT THREADS | THREAD 1 | BACKUP 1 | | | | BACKUP 5 | | | | | | | |
| | THREAD 2 | BACKUP 2 | | BACKUP 6 | | | | | | | | | |
| | THREAD 3 | BACKUP 3 | | BACKUP 7 | | | | | | | | | |
| | THREAD 4 | BACKUP 4 | | | | BACKUP 8 | | | | | | | |

METHOD, DEVICE AND COMPUTER PROGRAM PRODUCT FOR DATA BACKUP

CROSS-REFERENCE TO RELATED APPLICATION

This patent application claims priority, under 35 U.S.C. § 119, of Chinese Patent Application No. 201911284829.8, filed Dec. 13, 2019, which is incorporated by reference in its entirety.

FIELD

Embodiments of the present disclosure generally relate to computer technologies, and specifically to a method, device and computer program product for data backup.

BACKGROUND

With the development of information technology, the importance of data is increasing. Data backup can prevent data loss caused by misoperation or system failures. At the same time, as data increases, the number of clients that need backup also increases. In this case, data backup policies, especially schedules of the backups of the clients, are critical in a backup system. Therefore, an appropriate mechanism for setting data backup policies is required.

SUMMARY

Embodiments of the present disclosure provide a method, device and computer program product for data backup.

In a first aspect of the present disclosure, a method for data backup is proposed. The method comprises: obtaining a respective current value of an attribute associated with a respective backup for at least one client in a backup system and an expected time window for performing the respective backup; determining a respective duration of the respective backup based on the respective current value; and determining a respective backup time period for performing the respective backup for the at least one client based on the respective duration and the expected time window.

In a second aspect of the present disclosure, an electronic device is proposed. The device comprises at least one processing unit and at least one memory. The at least one memory is coupled to the at least one processing unit and at least one memory. The at least one memory is coupled to the at least one processing unit and stores instructions to be executed by the at least one processing unit. The instructions, when executed by the at least one processing unit, cause the device to perform acts comprising: obtaining a respective current value of an attribute associated with a respective backup for at least one client in a backup system and an expected time window for performing the respective backup; determining a respective duration of the respective backup based on the respective current value; and determining a respective backup time period for performing the respective backup for the at least one client based on the respective duration and the expected time window.

In a third aspect of the present disclosure, a computer program product is proposed. The computer program product is tangibly stored on a non-transitory computer-readable medium and includes machine-executable instructions. The machine-executable instructions, when executed, cause the machine to implement any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

Throughout the drawings, the same or similar reference symbols refer to the same or similar elements.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein can be implemented in various manners, and should not be limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "a first", "a second" and others can denote different or identical objects. The following text may also contain other explicit or implicit definitions.

Traditionally, client protection management and backup planning need to consider business impact and system load, and need to be frequently adjusted as the clients and the change in environment. Therefore, the configuration of data backup policies causes a large amount of complex and high-cost manual work.

Although a traditional backup system can guide users in how to manually configure data backup policies for their clients, actual situations are not so ideal. Many users still complain that they cannot complete all backups for their clients within their expected time window. Since the users' clients and business change over time, some users even report system crashes after the system has been running for a period of time. In addition, as the environment changes, the configuration of the original data backup policies becomes worse, and the backup system load is severely unbalanced. At the same time, the users also complain that the data backup policies are difficult to maintain.

According to example embodiments of the present disclosure, an improved solution for data backup is proposed. In this solution, a respective current value of an attribute associated with a respective backup for at least one client in a backup system and an expected time window for performing the respective backup are obtained, and a respective duration of the respective backup is determined based on the respective current value. Thereby, a respective backup time period for performing the respective backup for the at least one client can be determined based on the respective duration and the expected time window In this way, the duration of the backup to be performed may be easily predicted based on the attribute associated with the client's backup, and on this basis, the backup may be automatically scheduled within a specified expected time window. As such, when the client changes, such as when the client is added or removed, the data backup policy may be updated without a large amount of manual work.

Figure 1:
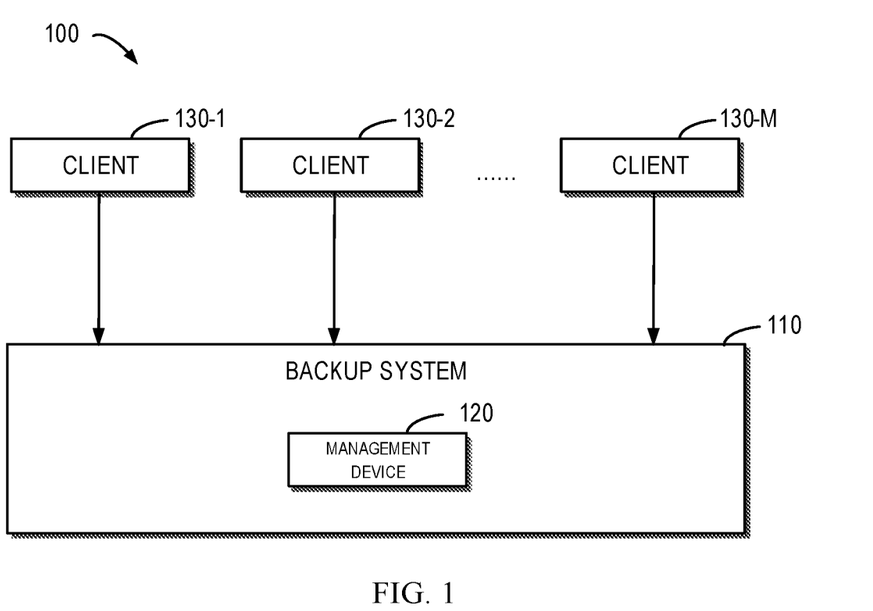
FIG. 1 illustrates a schematic diagram of an example of a backup environment according to some embodiments of the present disclosure.

Hereinafter, specific examples of the present solution will be described in more detail with reference to FIG. 1 through FIG. 7. FIG. 1 illustrates a schematic diagram of an example of a backup environment 100 according to some embodiments of the present disclosure. The backup environment 100 includes a backup system 110 and a plurality of clients 130-1 to 130-M (in which M is an integer greater than 0, hereinafter collectively referred to as "client 130"). According to the embodiments of the present disclosure, the backup system 110 is configured to back up data of each client 130.

The backup system 110 includes a management device 120. The management device 120 may include, but is not limited to, any device with computing and storage capabilities, such as a cloud computing device, a mainframe computer, a personal computer, a desktop computer, a laptop computer, a tablet computer and a personal digital assistant. Although not shown, the backup system 110 may further include one or more storage devices for storing the backup data. The storage device may include but not limited to any device having storage capabilities such as a cloud storage device, a distributed storage device, a magnetic disk, an optical disk, etc.

The management device 120 is configured to manage the backup system 110. According to the embodiment of the present disclosure, the management device 120 can manage a data backup policy. Specifically, the management device 120 can predict the duration of the next round of backup of the client based on values of attributes of the client 130. In addition, the management device 120 may further properly arrange backup time periods of a group of clients 130 within the expected time window.

Figure 2:
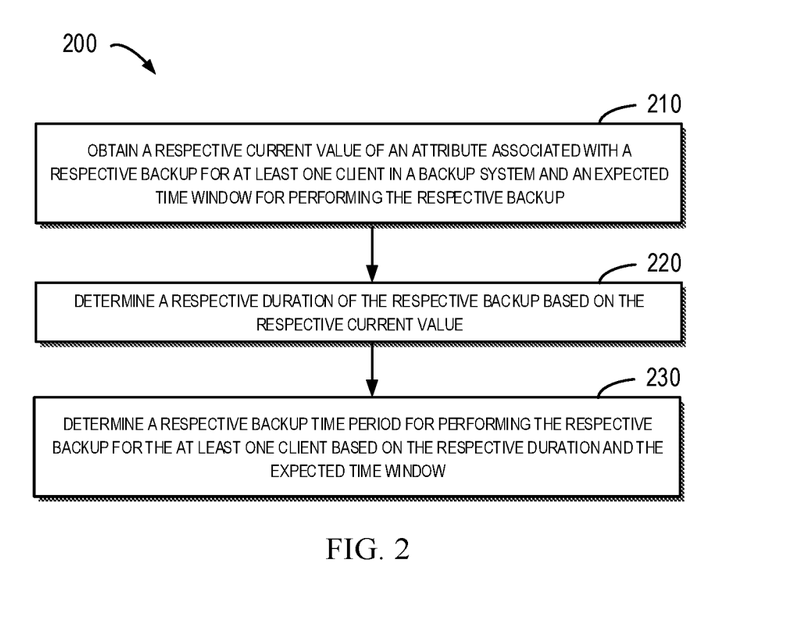
FIG. 2 illustrates a flowchart of a method for data backup according to some embodiments of the present disclosure.

Hereinafter, operations performed by the management device 120 will be described in more detail with reference to FIG. 2 through FIG. 6. FIG. 2 illustrates a flowchart of a method 200 for data backup according to some embodiments of the present disclosure. The method 200 may be implemented for example by the management device 120 shown in FIG. 1. It should be understood that the method 200 may further include additional steps not shown and/or steps shown may be omitted, and the scope of the present disclosure is not limited in this regard.

At 210, the management device 120 obtains a respective current value of an attribute associated with a respective backup of at least one client 130 in the backup system 110 and an expected time window for performing the respective backup. In some embodiments, the management device 120 may periodically determine the clients 130 that will be backed up within a configurable time interval, and obtain the expected time window and attribute values associated with the backups of these clients 130. For example, the management device 120 may determine the clients 130 that will be backed up each day, and obtain the expected time window and the attribute values associated with the backups of these clients 130. In this case, the determination of the clients 130 may be based on the backup dates of the clients 130. The backup dates can be directly specified by the clients 130, or can be calculated based on initial backup dates and backup execution frequencies (for example, daily, weekly, monthly, etc.).

The backup system 110 records statistical information of a backup status and characteristic data of each client 130, and this statistical information may reflect the hidden impact by the system load, client behavior (e.g., change rate) and the network. The management device 120 may select attributes that are crucial for the backup of the client 130 from such statistical information, and obtain the current values of these attributes.

These attributes may include, but are not limited to: a client type (for example, virtual machine, file system, SQL, Oracle, etc.), a client setting (for example, custom setting for the client 130, e.g., some data on the client 130 may be excluded from the backup), a total protecting byte number (the number of bytes of all data to be backed up by the client 130), a total protecting file number (the number of all files to be backed up by the client 130), a data encryption level (the encrypt level of the data of the client 130), and a backup target (e.g., a target server to which the data of the client 130 is to be backed up). The values of the above attributes of different clients 130 that are backed up by the backup system 110 may be different, and the values of a certain attribute of the same client 130 at different times may also change (for example, the client setting, the total protecting byte number, the total protecting file number, etc.).

Figure 3:
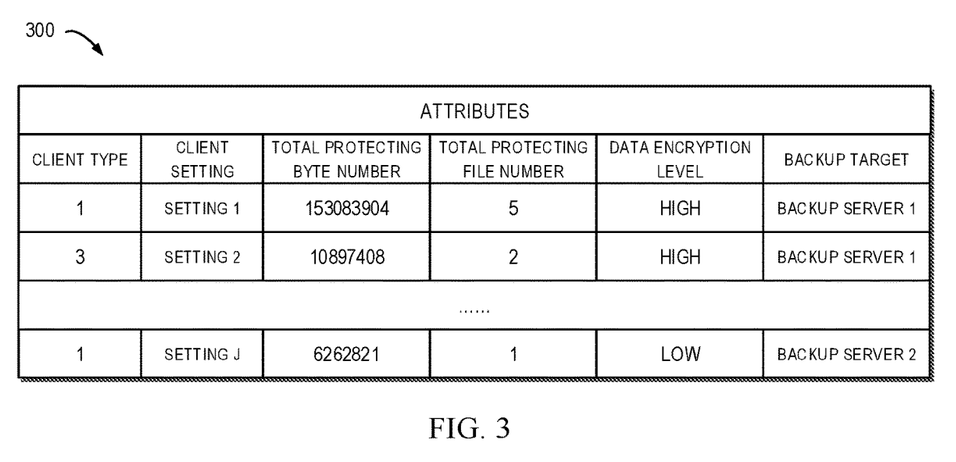
FIG. 3 illustrates a schematic diagram of an example of attributes according to some embodiments of the present disclosure.

For example, FIG. 3 shows a schematic diagram 300 of an example of attributes according to some embodiments of the present disclosure. Some attributes and attribute values obtained by the management device 120 are shown in FIG. 3. It should be appreciated that the attributes and attribute values listed in FIG. 3 are illustrative. The scope of embodiments of the present disclosure is not limited in this regard.

In addition to obtaining the current value of the associated attribute, the management device 120 may further obtain from the client 130 an expected time window within which the backup is to be performed for the client 130. For example, the client 130 may specify a time period (e.g., midnight or any time that does not affect the business, etc.) that may be used to perform the backup.

Further, in some embodiments, one or more clients 130 with the same expected time window may form a client group. On the one hand, the client group may be specified by the user. For example, a bank's administrator may specify that all clients of the bank belong to the same client group and specify the same expected time window for all clients.

On the other hand, the client group may be automatically divided by the backup system 110. For example, the backup system 110 may group one or more clients 130 with the same expected time window into the same client group. The determination of the backup time period to be described below is performed for the clients in the same client group within the same expected time window.

At 220, the management device 120 determines a respective duration of a respective backup of the at least one client 130 based on the obtained respective current value. The management device 120 may determine the duration in various ways. In some embodiments, in order to determine the duration, the management device 120 may use a prediction model that may characterize an association between the value of the attribute and the duration of the backup, such as various types of linear regression models.

Figure 4:
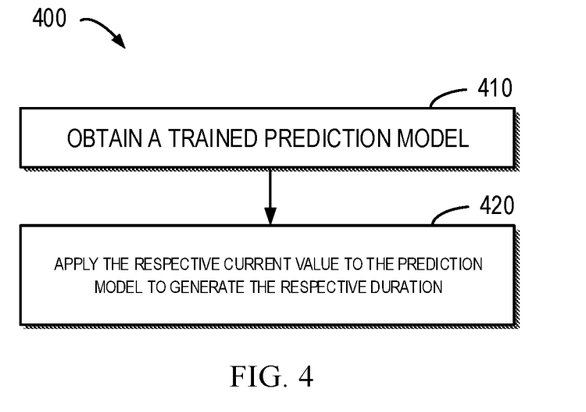
FIG. 4 illustrates a flowchart of a method of using a prediction model according to some embodiments of the present disclosure.

Reference will be made to FIG. 4 to describe a flowchart 400 of a method of using a prediction model according to some embodiments of the present disclosure. At 410, the management device 120 may obtain a trained prediction model. The prediction model may be configured as required. The prediction model may be trained with training data to determine the values of the parameters of the prediction model. The prediction model and the training of the prediction model will be briefly introduced to facilitate better understanding of the prediction model.

Since exact values of the durations of the backup to be performed needs to be predicted, a supervised learning method using for example a generalized linear regression model is taken as a prediction model. Given the training data input and output, this supervised learning method may learn a function that may best approximate the relationship between the input and the output. In this text, the generalized linear regression model is as follows:

$$f(w) := \lambda R(w) + \frac{1}{n} \sum_{i=1}^{n} L(w; x_i, y_i), \quad (1)$$

where f(w) represents an objective function that depends on the weight w, $x_i$ represents the training data, $y_i$ represents a corresponding label of the training data (which is expected to be predicted), and L(w;) represents a loss function for measuring an error about the training data in the model, λR(w) represents a regularization term for controlling the complexity of the model, λ represents a fixed regularization parameter (which is greater than 0), λ defines the tradeoff between a minimized loss (i.e., training error) and a minimized model complexity (i.e., avoid overfitting), and n represents the number of samples in the training data.

Such prediction model may be trained by any device having computing capabilities, such as a computing device, a server, an edge computing node, etc. which are external to the management device 120. In some cases, the prediction model may also be trained by the management device 120. Hereinafter, the training of the prediction model is described as being performed by the management device 120 only for ease of discussion. Specifically, the management device 120 may obtain a plurality of previous values of the attributes of the plurality of clients 130 in the backup system 110 and a plurality of previous durations of the respective backups of the plurality of clients 130 as training data. The management device 120 may use this training data to train the prediction model, so that the prediction model may best approximate the relationship between the attribute values and the durations. In some embodiments, the previous values might not be numerical values. For this reason, the management device 120 may perform a hash operation on the previous values, and apply a hash result to the prediction model to determine the durations.

After the training is completed, the prediction model may be deployed into the management device 120, and used by the management device 120 for duration prediction. Thus, at 420 of FIG. 4, the management device 120 applies the respective current values of the at least one client 130 to the prediction model to generate a respective duration. In some embodiments, the management device 120 may hash the current values, and apply the hash result to the prediction model to determine the durations. Since the prediction model can accurately reflect the relationship between the attribute values and the durations, the durations predicted based on the current attribute values have a fairly high accuracy.

Referring back to FIG. 2, at 230, the management device 120 determines a respective backup time period for performing a respective backup on the at least one client 130 based on the respective duration of the at least one client 130 and the determined expected time window. In some embodiments, the management device 120 may determine the backup time period of the client 130 as having the predicted duration and falling within the expected time window.

In some embodiments, the backup system 110 may provide two backup modes: a balanced first backup mode and a fast second backup mode. In the first backup mode, the backup time period is evenly distributed within the expected time window. In the second backup mode, the backup system 110 performs backup under a maximum workload. The backup mode may be automatically selected by the management device 120 (for example, according to system load conditions), or may be specified by the client 130. Furthermore, as stated above, in some embodiments, one or more clients 130 having the same expected time window may form a client group, and clients 130 of the same client group may have the same backup mode. Further, the backup mode may be applicable to all client groups in the backup system 110, or may be configured separately for a single client group.

The management device 120 may determine a backup mode associated with the at least one client 130, and determine the backup time period based on the backup mode. In the case where there is only a single client in the client group, since the backup of the single client will be performed at a first time (i.e., the beginning of the expected time window) in either mode, it will not be discussed in detail here.

In the case where there are a plurality of clients in the client group, the management device 120 may determine a backup mode associated with the plurality of clients 130, and the backup mode indicates a mode of distribution of a plurality of backup time periods of the plurality of clients 130 in the same client group within the expected time window. In the case where the backup mode is the first backup mode, the management device 120 may determine the plurality of backup time periods of the plurality of clients 130 based on the respective durations and expected time window, such that the plurality of backup time periods are evenly distributed within the expected time window.

Figure 5:
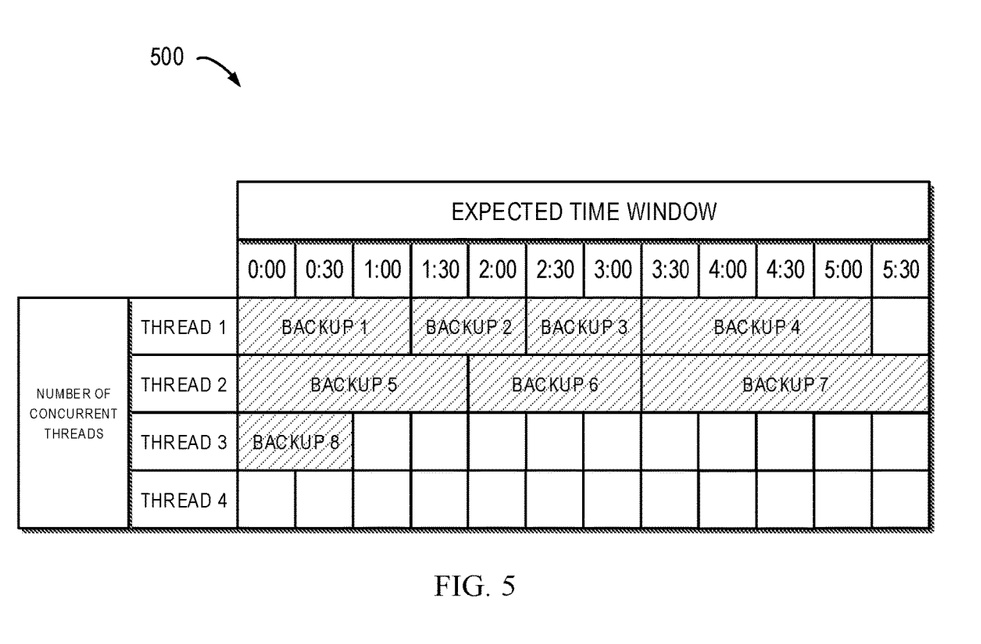
FIG. 5 illustrates a schematic diagram of an example of backup time periods determined in a first backup mode according to some embodiments of the present disclosure.

For example, FIG. 5 illustrates a schematic diagram 500 of an example of backup time periods determined in the first backup mode according to some embodiments of the present disclosure. As shown in FIG. 5, the expected time window is from 0:00 to 6:00, and a configurable time granularity for triggering the backup is 30 minutes. The backups 1 to 8 respectively corresponding to the clients 1 to 8 are evenly distributed within the expected time window. Although the number of concurrent threads that may be used to perform backups in the backup system 110 is limited to four, not all threads are used to perform the backups. It can be seen that in the first backup mode, the entire expected time window is fully utilized to arrange the backups smoothly and evenly, to ensure the system load is small and the network balanced.

In addition, when the backup mode is the second backup mode, the management device 120 may determine a plurality of backup time periods based on the durations and the expected time window, such that the workload of the backup system 110 performing backups simultaneously reaches an upper load limit of the backup system 110.

Figure 6:
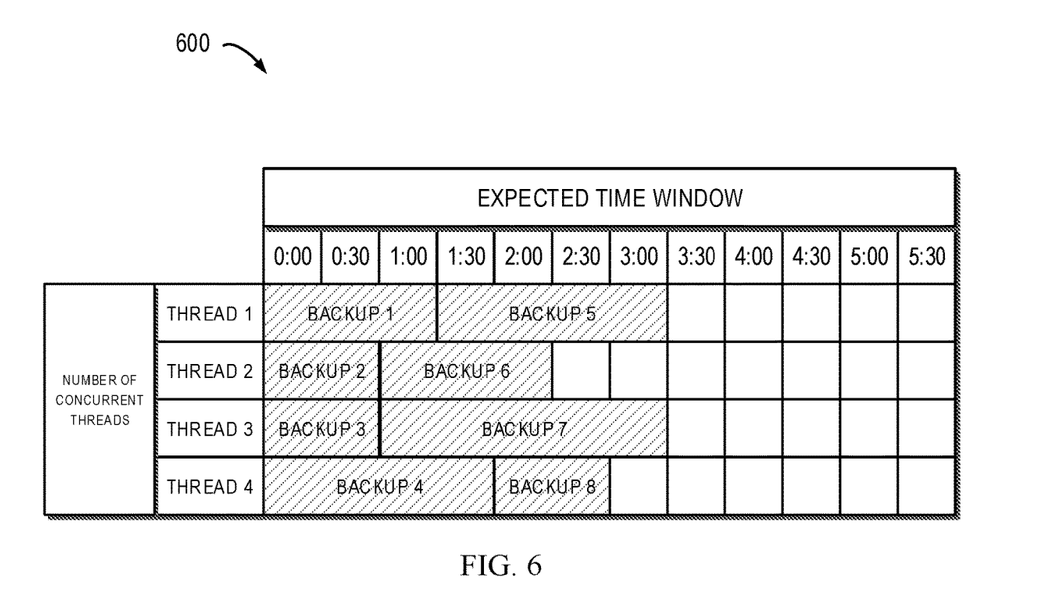
FIG. 6 illustrates a schematic diagram of an example of backup time periods determined in a second backup mode according to some embodiments of the present disclosure.

For example, FIG. 6 illustrates a schematic diagram 600 of an example of backup time periods determined in the second backup mode according to some embodiments of the present disclosure. Similar to FIG. 5, the expected time window in FIG. 6 is from 0:00 to 6:00, a configurable time granularity for triggering the backup is 30 minutes, and the number of concurrent threads that may be used to perform backups in the backup system 110 is limited to four. Unlike in FIG. 5, in FIG. 6, all threads are fully utilized to perform and to complete the backups as quickly as possible. It should be understood that the data backup policy given in FIGS. 5 and 6 are illustrative. The scope of embodiments of the present disclosure is not limited in this regard.

In addition, in some embodiments, in the initial stage, since there is no training data, the prediction model cannot be trained to determine the exact durations, and thus failing to determine the backup time periods. In this case, the management device 120 may perform backups for the clients 130 in the fast second backup mode, and perform backups one time at a predetermined time interval (e.g., every hour) to collect training data as fast as possible, and actively perform backups to provide a good user experience.

In this way, the present solution may accurately predict the duration of each client's backup to be performed using the trained prediction model. In addition, the present solution may automatically manage and adjust the backup time periods, avoid frequent manual work, and provide a good user experience.

Figure 7:
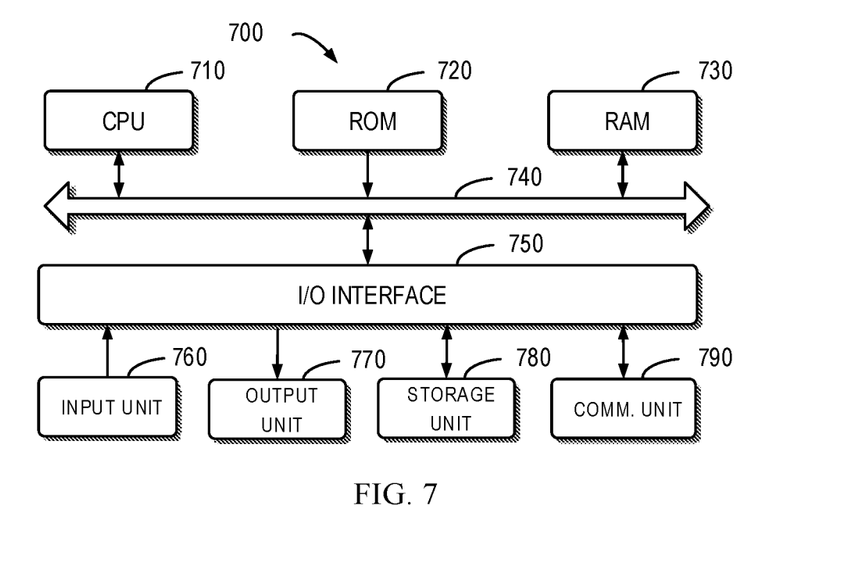
FIG. 7 illustrates a schematic block diagram of an example device that can be used to implement embodiments of the present disclosure.

FIG. 7 illustrates a schematic block diagram of an example device 700 that can be used to implement embodiments of the present disclosure. For example, the management device 120 shown in FIG. 1 may be implemented by the device 700. As shown in FIG. 8, the device 700 comprises a central processing unit (CPU) 710 which is capable of performing various processes in accordance with computer program instructions stored in a read only memory (ROM) 720 or computer program instructions loaded from a storage unit 780 to a random access memory (RAM) 730. In the RAM 730 are stored various programs and data as required by operation of the device 700. The CPU 710, the ROM 720 and the RAM 730 are connected to one another via a bus 740. An input/output (I/O) interface 750 is also connected to the bus 740.

The following components in the device 700 are connected to the I/O interface 750: an input unit 760 including a keyboard, a mouse, or the like; an output unit 770 such as various types of displays and speakers; a storage unit 780 such as a magnetic disk or optical disk; and a communication unit 790 such as a network card, a modem, a wireless communication transceiver or the like. The communication unit 790 allows the device 700 to exchange information/data with other devices via a computer network such as the Internet and/or various telecommunication networks.

The processing unit 710 performs various methods and processes described above, for example method 200. For example, in some embodiments, the method 200 may be implemented as a computer software program, which is tangibly contained in a machine-readable medium, for example the storage unit 780. In some embodiments, part or all of the computer programs may be loaded and/or installed on the device 700 via ROM 720 and/or communication unit 790. When the computer program is loaded in the RAM 730 and executed by CPU 710, one or more acts of the method 200 described above may be executed.

The present disclosure may be a method, apparatus, system and/or computer program product. The computer program product may include a computer-readable medium on which computer-readable program instructions for executing various aspects of the present disclosure are embodied.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage mediums includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagram block or blocks.

The computer-readable program instructions may also be loaded onto a computer, other programmable data processing apparatuses, or other devices to cause a series of operational steps to be performed on the computer, other programmable apparatuses or other devices to produce a computer implemented process, such that the instructions which execute on the computer, other programmable apparatuses, or other devices implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for data backup, comprising:
  periodically determining, by a processor of a computing device, at least one client in a backup system for a respective backup within a predetermined time interval based on backup dates of the least one client;
  obtaining, by the processor of the computing device, a respective current value of an attribute associated with the respective backup for the at least one client in the backup system and an expected time window specified by a corresponding client based on a preference of the corresponding client for performing the respective backup;
  determining, by the processor of the computing device, a respective duration of the respective backup based on the respective current value, wherein determining the respective duration comprises:
    in response to determining insufficient initial training data exists to create an initial prediction model, generating sufficient initial training data as fast as possible by performing a series of backups in a second backup mode, such that a workload of the backup system performing backups simultaneously reaches an upper load limit of the backup system,
    in response to determining sufficient initial training data exists to create the initial prediction model, applying, by the processor of the computing device, the initial prediction model and performing backups at the predetermined time interval to collect training data,
  updating, by the processor of the computing device, the initial prediction model with the training data including determining values of parameters of the updated prediction model including a relationship between a value of an attribute and a duration of a backup, wherein when previous values are not numerical values,
  performing, by the processor of the computing device, a hash operation on previous values to generate a hash result,
  applying, by the processor of the computing device, the updated prediction model that characterizes an association between the value of the attribute and the duration of the backup based on the hash result, wherein the updated prediction model comprises a linear regression model including the training data, a corresponding label of the training data, a loss function for measuring an error about the training data in the linear regression model, a fixed regularization parameter, tradeoff between a minimized loss, and a minimized model complexity, wherein the fixed regularization parameter is greater than zero, and applying, by the processor of the computing device, the respective current value to the updated prediction model to generate the respective duration;

determining, by the processor of the computing device, a respective backup time period for performing the respective backup for the at least one client based on the respective duration and the expected time window; and automatically scheduling and performing, by the processor of the computing device, the respective backup in the backup system for the at least one client within the expected time window based on the respective backup time period, wherein the backup system including one or more storage devices including a magnetic disk.

2. The method according to claim 1, wherein the attribute comprises at least one of: a client type, a client setting, a total protecting byte number, total protecting file number, a data encryption level and a backup target.

3. The method according to claim 1, wherein the updated prediction model is updated based on a plurality of previous values of the attribute of a plurality of clients in the backup system and a plurality of previous durations of respective backups of the plurality of clients.

4. The method according to claim 1, wherein the updated prediction model comprises the linear regression model including a regularization term for controlling the complexity of the linear regression model.

5. The method according to claim 4, wherein the linear regression model comprises:

$$f(w) := \lambda R(w) + \frac{1}{n}\sum_{i=1}^{n} L(w; x_i, y_i)$$

wherein f(w) represents an objective function that depends on a weight w, x_i represents the training data, y_i represents the corresponding label of the training data, and L(w;) represents the loss function for measuring the error about the training data in the model, $\lambda R(w)$ represents the regularization term for controlling the complexity of the model, $\lambda$ represents the fixed regularization parameter, $\lambda$ defines the tradeoff between the minimized loss and the minimized model complexity, and n represents the number of samples in the training data.

6. The method according to claim 1, wherein determining the respective backup time period comprises:

determining a backup time period of each of the at least one client as having the corresponding duration and falling within the corresponding expected time window.

7. The method according to claim 1, wherein the at least one client comprises a plurality of clients, and determining the respective backup time period comprises:

determining a backup mode associated with the plurality of clients, the backup mode indicating a distribution mode of a plurality of backup time periods of the plurality of clients within the expected time window;

in accordance with a determination that the backup mode is a first backup mode, determining the plurality of backup time periods of the plurality of clients based on the respective durations and the expected time window, such that the plurality of backup time periods are evenly distributed within the expected time window; and in accordance with a determination that the backup mode is the second backup mode, determining the plurality of backup time periods based on the respective durations and the expected time window.

8. The method according to claim 1, wherein determining the respective duration comprises:

performing the hash operation on the previous values to generate the hash result; and applying the hash result to the updated prediction model to determine the respective duration.

9. An electronic device, comprising:

a processor;

a memory coupled to the processor to store instructions, which when executed by the processor, causing the processor to perform operations, the operations comprising:

periodically determining, by the processor of the electronic device, at least one client in a backup system for a respective backup within a predetermined time interval based on backup dates of the least one client;

obtaining a respective current value of an attribute associated with the respective backup for the at least one client in the backup system and an expected time window specified by a corresponding client based on a preference of the corresponding client for performing the respective backup;

determining a respective duration of the respective backup based on the respective current value, wherein determining the respective duration comprises:

in response to determining insufficient initial training data exists to create an initial prediction model, generating sufficient initial training data as fast as possible by performing a series of backups in a second backup mode, such that a workload of the backup system performing backups simultaneously reaches an upper load limit of the backup system, in response to determining sufficient initial training data exists to create the initial prediction model, applying the initial prediction model and performing backups at the predetermined time interval to collect training data, updating the initial prediction model with the training data including determining values of parameters of the updated prediction model including a relationship between a value of an attribute and a duration of a backup, wherein when previous values are not numerical values, performing, by the processor of the electronic device, a hash operation on previous values to generate a hash result, applying the updated prediction model that characterizes an association between the value of the attribute and the duration of the backup based on the hash result, wherein the updated prediction model comprises a linear regression model including the training data, a corresponding label of the training data, a loss function for measuring an error about the training data in the linear regression model, a fixed regularization parameter, tradeoff between a minimized loss, and a minimized model complexity, wherein the fixed regularization parameter is greater than zero,
performing a hash operation on previous values to generate a hash result,
applying the hash result to the updated prediction model to determine the respective duration, and
applying the respective current value to the updated prediction model to generate the respective duration;
determining a respective backup time period for performing the respective backup for the at least one client based on the respective duration and the expected time window; and
automatically scheduling and performing the respective backup in the backup system for the at least one client within the expected time window based on the respective backup time period, wherein the backup system including one or more storage devices including a magnetic disk.

10. The device according to claim 9, wherein the attribute comprises at least one of: a client type, a client setting, a total protecting byte number, a total protecting file number, a data encryption level and a backup target.

11. The device according to claim 9, wherein the updated prediction model is updated based on a plurality of previous values of the attribute of a plurality of clients in the backup system and a plurality of previous durations of respective backups of the plurality of clients.

12. The device according to claim 9, wherein the updated prediction model comprises the linear regression model including a regularization term for controlling the complexity of the linear regression model.

13. The device according to claim 9, wherein determining the respective backup time period comprises:
determining a backup time period of each of the at least one client as having the corresponding duration and falling within the corresponding expected time window.

14. The device according to claim 9, wherein the at least one client comprises a plurality of clients, and determining the respective backup time period comprises:
determining a backup mode associated with the plurality of clients, the backup mode indicating a distribution mode of a plurality of backup time periods of the plurality of clients within the expected time window;
in accordance with a determination that the backup mode is a first backup mode, determining the plurality of backup time periods of the plurality of clients based on the respective durations and the expected time window, such that the plurality of backup time periods are evenly distributed within the expected time window; and
in accordance with a determination that the backup mode is the second backup mode, determining the plurality of backup time periods based on the respective durations and the expected time window.

15. A non-transitory machine-readable storage medium having instructions stored therein, which when executed by a processor of a computing device, cause the processor to perform operations, the operations comprising:
periodically determining at least one client in a backup system for a respective backup within a predetermined time interval based on backup dates of the least one client;
obtaining a respective current value of an attribute associated with the respective backup for the at least one client in the backup system and an expected time window specified by a corresponding client based on a preference of the corresponding client for performing the respective backup;
determining a respective duration of the respective backup based on the respective current value, wherein determining the respective duration comprises:
in response to determining insufficient initial training data exists to create an initial prediction model, generating sufficient initial training data as fast as possible by performing a series of backups in a second backup mode, such that a workload of the backup system performing backups simultaneously reaches an upper load limit of the backup system,
in response to determining sufficient initial training data exists to create the initial prediction model, applying the initial prediction model and performing backups at the predetermined time interval to collect training data,
updating the initial prediction model with the training data including determining values of parameters of the updated prediction model including a relationship between a value of an attribute and a duration of the backup, wherein when previous values are not numerical values,
performing, by the processor of the computing device, a hash operation on previous values to generate a hash result,
applying the updated prediction model that characterizes an association between the value of the attribute and the duration of the backup based on the hash result, wherein the updated prediction model comprises a linear regression model including the training data, a corresponding label of the training data, a loss function for measuring an error about the training data in the model, a fixed regularization parameter, tradeoff between a minimized loss, and a minimized model complexity, wherein the fixed regularization parameter is greater than zero,
performing a hash operation on previous values to generate a hash result,
applying the hash result to the updated prediction model to determine the respective duration, and
applying the respective current value to the updated prediction model to generate the respective duration;
determining a respective backup time period for performing the respective backup for the at least one client based on the respective duration and the expected time window; and
automatically scheduling and performing the respective backup in the backup system for the at least one client within the expected time window based on the respective backup time period, wherein the backup system including one or more storage devices including a magnetic disk.

16. The non-transitory machine-readable storage medium according to claim 15, wherein the attribute comprises at least one of: a client type, a client setting, a total protecting byte number, a total protecting file number, a data encryption level and a backup target.

17. The non-transitory machine-readable storage medium according to claim 15, wherein the updated prediction model is updated based on a plurality of previous values of the attribute of a plurality of clients in the backup system and a plurality of previous durations of respective backups of the plurality of clients.

18. The non-transitory machine-readable storage medium according to claim 15, wherein the updated prediction model comprises the linear regression model including a regularization term for controlling the complexity of the linear regression model.

19. The non-transitory machine-readable storage medium according to claim 15, wherein determining the respective backup time period comprises:
   determining a backup time period of each of the at least one client as having the corresponding duration and falling within the corresponding expected time window.

20. The non-transitory machine-readable storage medium according to claim 15, wherein the at least one client comprises a plurality of clients, and determining the respective backup time period comprises:
   determining a backup mode associated with the plurality of clients, the backup mode indicating a distribution mode of a plurality of backup time periods of the plurality of clients within the expected time window;
   in accordance with a determination that the backup mode is a first backup mode, determining the plurality of backup time periods of the plurality of clients based on the respective durations and the expected time window, such that the plurality of backup time periods are evenly distributed within the expected time window; and
   in accordance with a determination that the backup mode is the second backup mode, determining the plurality of backup time periods based on the respective durations and the expected time window.

\* \* \* \* \*